United States Patent [19]
Diaferia et al.

[11] Patent Number: 4,774,628
[45] Date of Patent: Sep. 27, 1988

[54] METALCLAD SUBSTATION SUBDIVIDED INTO TIGHT COMPARTMENTS

[75] Inventors: Aldo Diaferia, Voreppe; Michel Messie, Grenoble, both of France

[73] Assignee: Merlin Gerin, Grenoble, France

[21] Appl. No.: 10,698

[22] Filed: Feb. 4, 1987

[30] Foreign Application Priority Data

Feb. 14, 1986 [FR] France ................................ 86 02130

[51] Int. Cl.[4] ............................................. H02B 5/00
[52] U.S. Cl. ................................ 361/335; 200/148 F; 361/341
[58] Field of Search ..................... 200/148 R–148 F; 361/333–335, 341, 355, 361

[56] References Cited

FOREIGN PATENT DOCUMENTS 0152611 8/1985 European Pat. Off. .
0611229 10/1948 United Kingdom ................ 361/341

Primary Examiner—A. D. Pellinen
Assistant Examiner—Gregory D. Thompson
Attorney, Agent, or Firm—Parkhurst & Oliff

[57] ABSTRACT

A metalclad substation having a busbar isolating switch including an operating mechanism housed in the busbar compartment. The movable contacts of the isolating switch are housed in a compartment separated by a tight insulating partition from the busbar compartment. Tight partitioning of the compartments enables operations to be carried out in the different compartments while maintaining at least one of the busbars switched on to supply the unaffected part of the installation.

5 Claims, 3 Drawing Sheets

METALCLAD SUBSTATION SUBDIVIDED INTO TIGHT COMPARTMENTS

BACKGROUND OF THE INVENTION

The invention relates to an electrical installation, notably a high voltage metalclad substation, having a metal enclosure, filled with a high dielectric strength gas, and subdivided into different compartments by tight insulating partitions.

A metalclad substation of the kind mentioned is made by assembling standard component parts, such as isolating switches, busbars and circuit breakers, each component being housed in a tight compartment. The partitioning limits the risk of an electric arc spreading from one compartment to the other and makes maintenance and repair operations easier, because only the part affected by the fault is opened to the atmosphere and disassembled. Housing each component in an individual compartment requires a large volume and is relatively costly. It has already been proposed to incorporate several functions in a single compartment but this simplification is prejudicial to the ease of carrying out operations on the substation. When an isolating switch is changed between two switch bays in the busbar, the two adjoining switch bays have to be switched off.

The object of the present invention is to achieve a simplified metalclad substation of reduced dimensions preserving the possibilities of performing operations on part of the substation, while the other part remains live.

SUMMARY OF THE INVENTION

The electrical installation according to the invention is characterized by the fact that the isolating switch mechanism is housed in the busbar compartment and is connected to the isolating switch movable contact, housed in the isolating switch compartment, by a mechanical link passing tightly through the partition separating the busbar compartment from the isolating switch compartment.

By fitting the isolating switch mechanism in the busbar compartment, it is possible to reduce the volume of the isolating switch compartment considerably, the length of which practically amounts to the isolation clearance between the open contacts in the disconnected position. A busbar can be isolated from the switch bay by opening the isolating switch and maintaining the insulating gas pressure in the isolating switch compartment. When these two conditions are met, the remainder of the switch bay can be disassembled and more particularly can be opened to the atmosphere, the isolated busbar remaining live to supply the substation switch bays. This arrangement is particularly advantageous for a double-busbar substation which enables the remaining parts of the substation which are not affected by the maintenance or repair operation to be supplied by the busbar which is intact. The isolating switch is of the sliding pin type mounted on an insulating operating rod passing through the partitioning insulator fitted between the busbar compartment and the isolating switch compartment. The invention can be applied to a single-phase or three-phase enclosure substation, the three-phase solution having the advantage of reduced dimensions.

Each substation switch bay naturally comprises the suitable components, such as current and potential transformers and earthing switches ensuring safety when an operation is carried out.

BRIEF DESCRIPTION OF THE DRAWINGS

Other advantages and characteristics will become more clearly apparent from the following description of an embodiment of the invention, given as an example only, and represented in the accompanying drawings, in which.

DESCRIPTION OF THE PREFERRED EMBODIMENT

Figure 1:
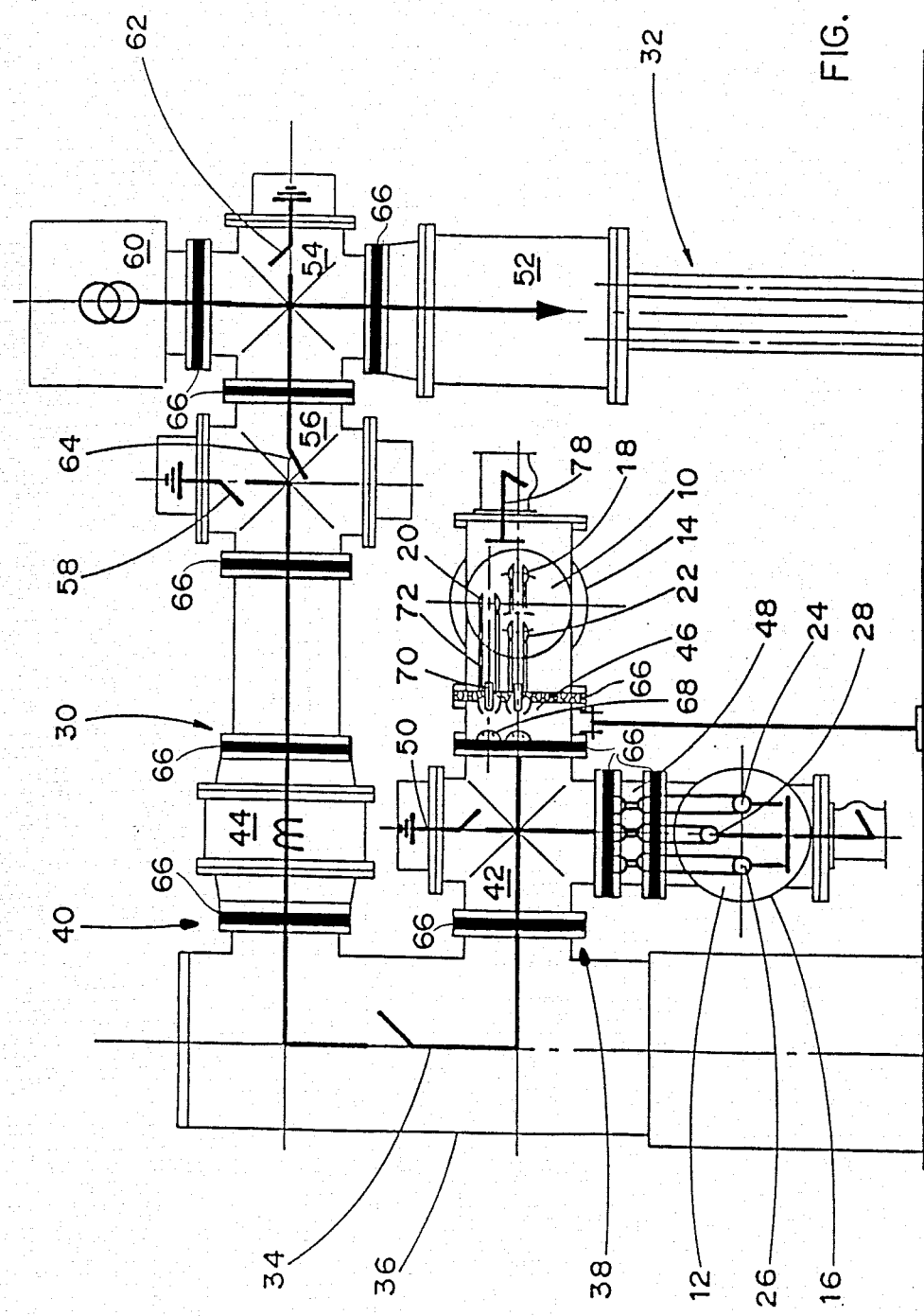
FIG. 1 is a schematic view of a metalclad substation switch bay according to the invention, the isolating switch part being represented schematically in cross-section.

In the Figures, a metalclad high voltage electrical distribution substation comprises two busbars 10, 12, extending in a perpendicular direction to the plane in FIG. 1. Each busbar 10, 12 comprises a cylindrical-shaped earthed metal enclosure 14, 16, surrounding 3 three-phase power supply conducting bars 18, 20, 22; 24, 26, 28. Located along the busbars 10, 12 are switch bays 30, only one of which is represented in FIG. 1, each switch bay 30 being associated with a feeder 32. The switch bay illustrated in FIG. 1 comprises a three-pole circuit breaker 34, housed in a cylindrical enclosure 36 and having two connecting flanges 38, 40 respectively to a connection compartment 42 and to a current measuring compartment 44. The busbars 10, 12 are respectively connected to the compartment 42 by means of isolating switch compartments 46, 48, described in detail below. The compartment 42 houses an earthing switch 50. The cables of the feeder 32 are connected to the current measuring compartment 44 via a cable box 52 of an earthing compartment 54 and an isolating switch compartment 56. The latter compartment 56 also includes an earthing switch 58. A potential measuring compartment 60 is connected to the earthing compartment 54. Each compartment comprises a cylindrical metal enclosure fitted with flanges or clamps for connection with the adjoining compartments. The corresponding components are located inside the compartment, notably three potential transformers in the measuring compartment 60, a three-phase earthing switch 62 in the compartment 54 and a three-phase line isolating switch 64 in the isolating switch compartment 56. The compartments are sealed and filled with sulphur hexafluoride under pressure. Partitioning between the compartments is provided by support insulators 66 fitted between the connecting flanges of the corresponding enclosures. The electrical conductors connecting the components contained in the compartments run through the support insulators 66.

Figure 2:
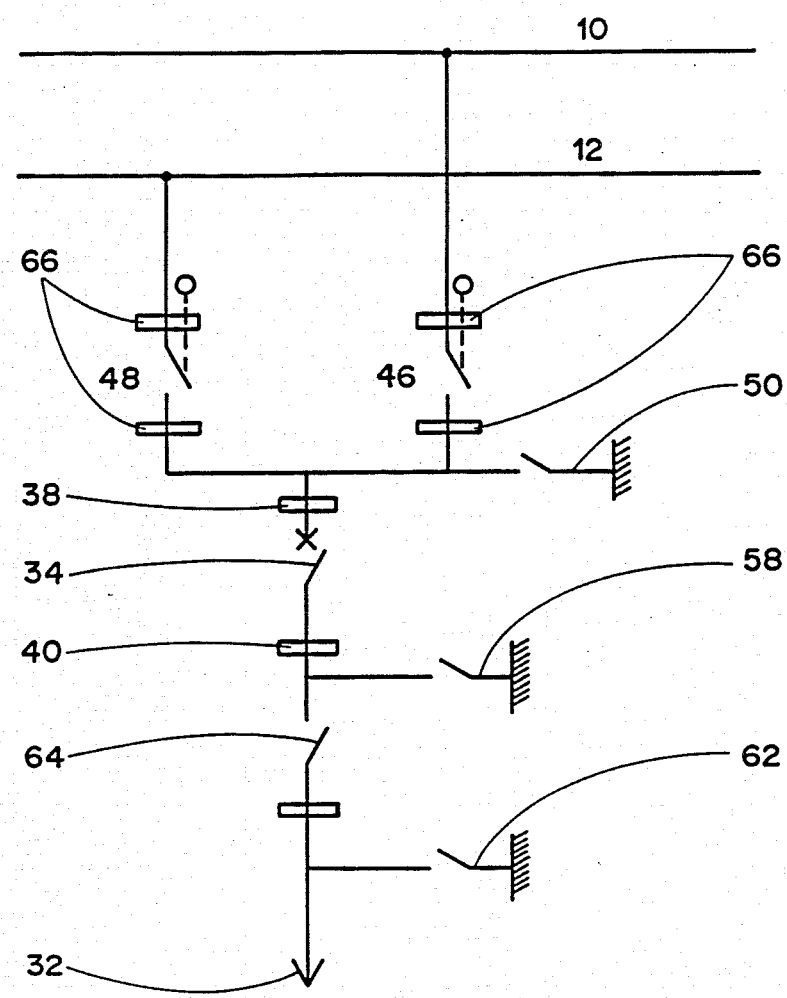
FIG. 2 is the wiring diagram of the switch bay illustrated in FIG. 1.

A substation of this kind is well-known in the art and does not require a more detailed description. Closing one of the isolating switches enables the switch bay to be supplied respectively by the busbar 10 or 12, the circuit breaker 34 providing protection of the feeder 32. When one of the busbars 10, 12 fails or is switched off for repairs, the switch bay can be supplied by the other busbar maintaining continuity of service. This operating mode is clearly apparent from the wiring diagram of the switch bay represented in FIG. 2.

Figure 3:
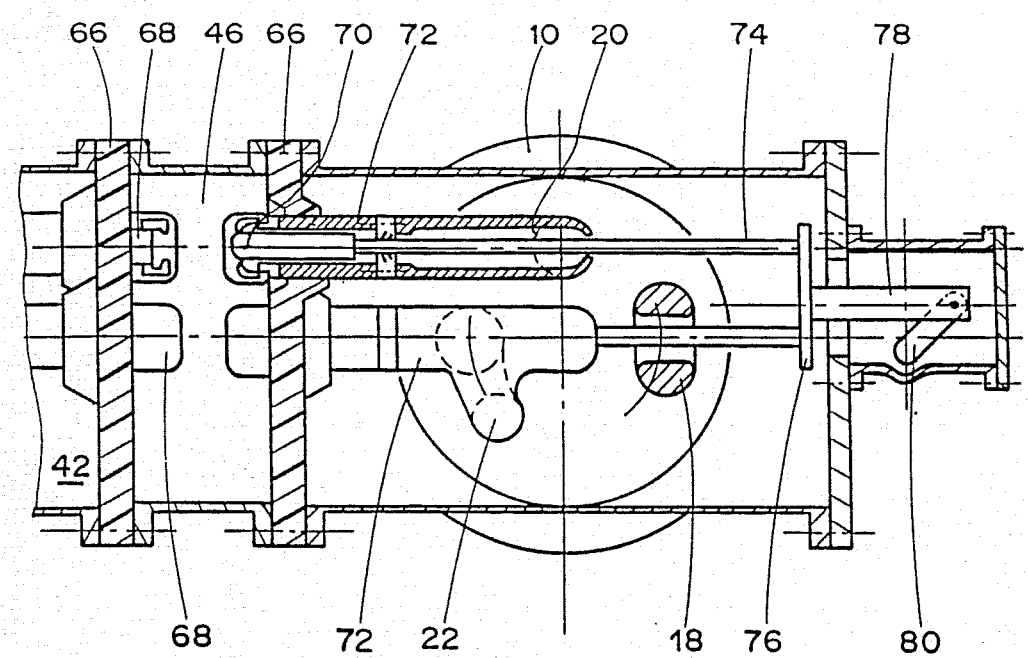
FIG. 3 is an enlarged view of the isolating switch of the switch bay according to FIG. 1, one phase of the isolating switch and one bar being shown in cross-section.
Figure 4:
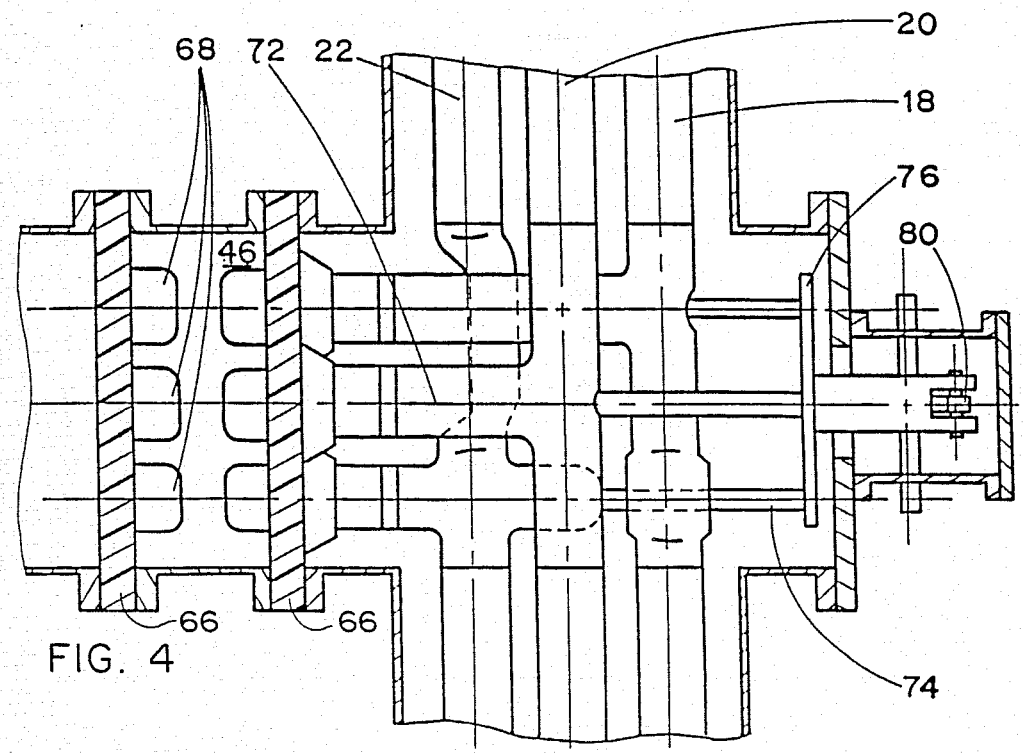
FIG. 4 is a plan view of FIG. 3, with the enclosure removed.

Referring more particularly to FIGS. 3 and 4 which represent the busbar 10 compartment and the associated isolating switch compartment 46, it can be seen that the support insulator 66 separating the isolating switch compartment 46 and the connection compartment 42, bears three stationary contacts 68 of the isolating switch. A contact pin 70 constituting the movable contact of the isolating switch is located facing each stationary contact 68, each contact pin 70 being mounted with sliding in a cylindrical sheath 72 which runs tightly through the support insulator 66 separating the busbar compartment and the isolating switch compartment 46.

The three sheaths 72 are each respectively connected to one of the bars 18, 20, 22 of the busbar 10. Each movable contact pin 70 is fixed to an insulating control rod 74, mounted with sliding in the sheath 72 and extending beyond the opposite end of the sheath from the contact pin 70. The three insulating control rods 74 are securely united by a bar 76 connected by means of a connecting rod 78 to an operating handle 80 whose shaft passes through the busbar 10 compartment enclosure. In the open position of the isolating switch, the contact pins 70 are retracted in the sheaths 72 and an isolating switch closing order is performed by counter-clockwise pivoting of the handle 80 in FIG. 3, which causes sliding of the bar 76, control rods 74 and contact pins 70 assembly in the direction of the stationary contacts 68 of the isolating switch. It can easily be seen that the isolating zone of the isolating switch is confined to the isolating switch compartment 46, whereas the isolating switch operating mechanism parts, namely the control rods 74, bar 76 and handle 80, are located in the busbar 10 compartment.

When an operation is carried out on one of the switch bays of the installation, for instance the switch bay illustrated in FIG. 1, the latter is isolated from the busbars 10, 12 by opening of the two isolating switches. The switch bay being electrically isolated, all the compartments or the compartment in which work is to be carried out, for example the compartment 42, can be opened to the atmosphere. This opening to the atmosphere is possible, even when one or both of the busbars 10, 12 are maintained live to supply the other switch bays of the substation. Isolation is ensured by the opening of the isolating switch whose contacts are located in a compartment 46 filled with sulphur hexafluoride under pressure. If the operation extends to one of the busbars, the latter must of course be switched off before the corresponding isolating switch compartment is opened, the remainder of the installation being supplied by the other busbar. Incorporating the isolating switch mechanism in the busbar compartment enables a considerable reduction in the volume of the isolating switch compartment 46, 48, and thereby in the overall dimensions of the substation, while preserving the disassembly and maintenance possibilities without interrupting the power supply to the installation as a whole.

The invention has been described as being applied to a three-phase substation, but it is clear that it can also be applied to mixed substations, for example with a three-phase busbar housed in a single enclosure, whereas the other components, notably the circuit breakers, are individually enclosed for each phase. The invention can also be applied to separate phase substations, each phase having its own earthed enclosure. The architecture of the substation may be different, notably the location of the circuit breaker, supply by one or two busbars and the control mode of the isolating switches.

What we claim is:

1. A high voltage metalclad electrical installation comprising:
   a metal enclosure filled with a high dielectric strength gas,
   tight insulating partitions subdividing said enclosure,
   a plurality of compartments bounded in said enclosure by said tight partitions, said compartments including a circuit breaker compartment, a busbar compartment and an isolating switch compartment located between the circuit breaker compartment and the busbar compartment,
   an electrical circuit breaker housed in the circuit breaker compartment,
   at least one conducting bar housed in the busbar compartment,
   at least one isolating switch having an operating mechanism, a movable contact and a mechanical link connecting the movable contact to the operating mechanism, said isolating switch providing in the closed position the electrical connection from the circuit breaker to the conducting bar and in the open position electrically isolating the circuit breaker from the conducting bar, said mechanism being housed in the busbar compartment and said movable contact in the isolating switch compartment, said mechanical link passing tightly through one of the plurality of partitions separating the busbar compartment and the isolating switch compartment.

2. An installation according to claim 1, wherein the isolating switch comprises a slidable contact and an insulating control rod rigitly secured to the slidable contact, said rod slidably passing through an insulating partition which separates the busbar compartment from the isolating switch compartment.

3. An installation according to claim 2, having a sheath connected to the bar housed in the busbar compartment, said rod being slidably mounted in a direction perpendicular to the longitudinal direction of the busbar, inside said sheath.

4. An installation according to claim 1, wherein each compartment comprises a cylindrical metal enclosure, the isolating switch compartment enclosure extending perpendicular to the busbar compartment enclosure to which it is connected.

5. An installation according to claim 4, wherein the partitions separating the compartments are constituted by support insulators and the enclosures of said compartments comprise connection flanges between which said insulators are fitted.

* * * * *